United States Patent
Wu et al.

(10) Patent No.: US 11,609,320 B2
(45) Date of Patent: Mar. 21, 2023

(54) DISPLAY DEVICE

(71) Applicant: HTC Corporation, Taoyuan (TW)

(72) Inventors: Chun-Yih Wu, Taoyuan (TW);
Ta-Chun Pu, Taoyuan (TW);
Yen-Liang Kuo, Taoyuan (TW)

(73) Assignee: HTC Corporation, Taoyuan (TW)

(*) Notice: Subject to any disclaimer, the term of this patent is extended or adjusted under 35 U.S.C. 154(b) by 0 days.

(21) Appl. No.: 17/748,040

(22) Filed: May 19, 2022

(65) Prior Publication Data

US 2023/0038946 A1    Feb. 9, 2023

Related U.S. Application Data

(60) Provisional application No. 63/228,603, filed on Aug. 3, 2021.

(51) Int. Cl.
| | | |
|---|---|---|
| G01S 13/58 | (2006.01) | |
| H01Q 1/27 | (2006.01) | |
| G06F 3/01 | (2006.01) | |
| G06F 3/0346 | (2013.01) | |
| G06F 3/041 | (2006.01) | |

(52) U.S. Cl.
CPC ............ *G01S 13/58* (2013.01); *G06F 3/013* (2013.01); *G06F 3/0346* (2013.01); *G06F 3/0416* (2013.01); *H01Q 1/273* (2013.01)

(58) Field of Classification Search
CPC ........................................................ G01S 13/58
See application file for complete search history.

(56) References Cited

U.S. PATENT DOCUMENTS

| | | | |
|---|---|---|---|
| 2007/0096565 A1* | 5/2007 | Breed | B60C 23/0408 200/600 |
| 2013/0278539 A1* | 10/2013 | Valentine | G06F 3/0418 345/174 |
| 2016/0178348 A1* | 6/2016 | Nagalla | G01S 17/06 250/203.2 |
| 2018/0129356 A1* | 5/2018 | Leigh | G01S 7/539 |
| 2020/0026360 A1* | 1/2020 | Baheti | G06F 3/0416 |
| 2021/0034160 A1* | 2/2021 | Hof | G01S 13/72 |
| 2021/0255625 A1* | 8/2021 | Baladhandapani | G06F 3/013 |
| 2022/0155817 A1* | 5/2022 | Woods, Jr. | G04R 60/10 |

* cited by examiner

*Primary Examiner* — Ryan A Lubit
(74) *Attorney, Agent, or Firm* — JCIPRNET

(57) ABSTRACT

A display device is provided. The display device includes a transparent substrate, a display, an antenna module, and a plurality of first conductive structures. The display emits image light to the transparent substrate. The antenna module emits a first beam to the transparent substrate. The plurality of first conductive structures is disposed on a first surface of the transparent substrate and a travel path of the image light, and forms a first conductive pattern. The plurality of first conductive structures change a direction of the first beam and generate a second beam to an object.

11 Claims, 4 Drawing Sheets

DISPLAY DEVICE

CROSS-REFERENCE TO RELATED APPLICATION

This application claims the priority benefit of U.S. application Ser. No. 63/228,603, filed on Aug. 3, 2021. The entirety of the above-mentioned patent application is hereby incorporated by reference herein and made a part of this specification.

BACKGROUND

Technical Field

The invention relates to a display device, and more particularly, to a handheld display device and a head-mounted display device.

Description of Related Art

Recently, according to the trend of display device thinning, the thickness of handheld display devices and head-mounted display devices has received significant attention. Traditionally, when a millimeter wave antenna module is used in a handheld display device, both the side and above of the handheld display device need to be provided with the millimeter wave antenna module. Accordingly, how to design a display device with reduced thickness is one of the research topics for technical personnel in this field.

SUMMARY

The invention provides a display device, in which a plurality of conductive structures are disposed on a surface of a transparent substrate of the display device, and the plurality of conductive structures may change a direction of an antenna radiation beam of a millimeter wave module, thereby increasing the coverage range of the antenna radiation beam of a single millimeter wave module. Therefore, under the requirement of the coverage range of the same antenna radiation beam, the number of millimeter wave antenna modules required to be disposed on the display device can be reduced, thereby reducing the thickness of the display device.

The display device of the invention includes a transparent substrate, a display, an antenna module, and a plurality of first conductive structures. The display emits image light to the transparent substrate. A radiation unit of the antenna module transmits a first beam to the transparent substrate. A plurality of first conductive structures are disposed on a first surface of the transparent substrate and a travel path of the image light and form a first conductive pattern. The plurality of first conductive structures change a direction the first beam and generate a second beam to the object.

Based on the above, according to the display device provided by the embodiments of the invention, by disposing a transparent substrate, a display, a radiation unit, together with a plurality of conductive structures, the image light and the beam are emitted respectively to the transparent substrate through the display and the radiation unit, and then the direction of the beam is changed by the plurality of conductive structures disposed on the surface of the transparent substrate and the travel path of the image light. In this manner, according to the embodiments of the invention, a plurality of conductive structures are disposed on the surface of the transparent substrate so as to achieve the effect of saving the number of the millimeter wave antenna modules, which can reduce the thickness of the display device.

In order to make the above-mentioned features and advantages of the invention more obvious and easy to understand, the following embodiments are given and described in detail with the accompanying drawings as follows.

DESCRIPTION OF THE EMBODIMENTS

Figure 1A:
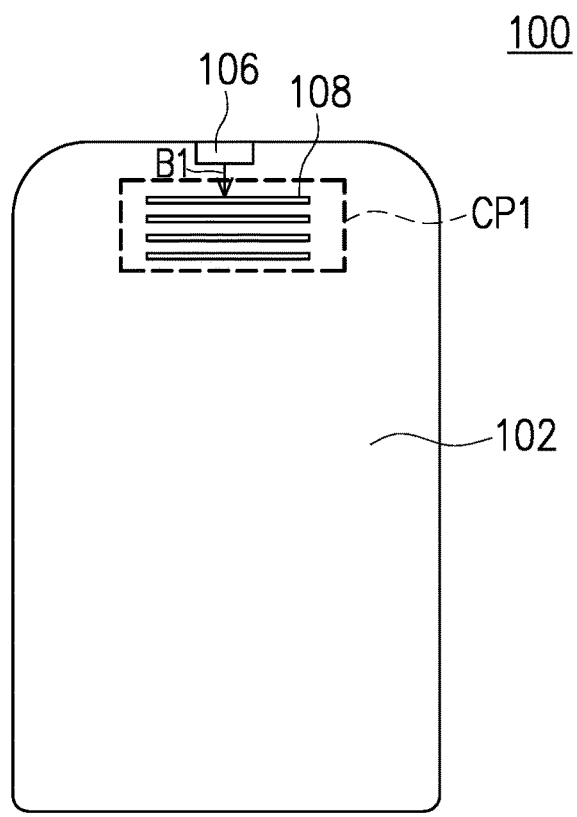
FIG. 1A is a top view of a display device according to an embodiment of the invention.
Figure 1B:
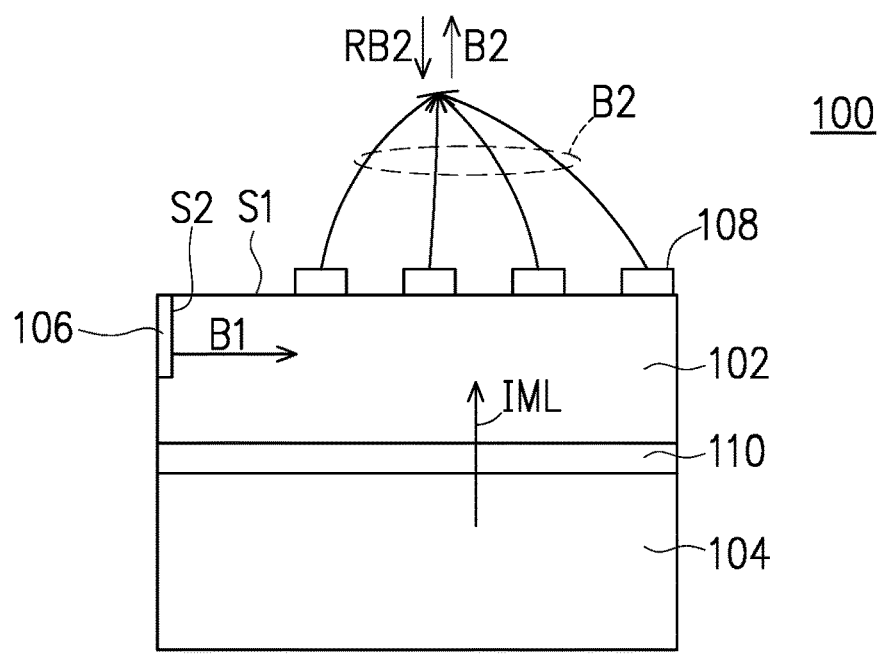
FIG. 1B is a side view of a display device according to an embodiment of the invention.

FIG. 1A is a top view of a display device according to an embodiment of the invention. FIG. 1B is a side view of a display device according to an embodiment of the invention. Please refer to FIG. 1A and FIG. 1B at the same time. A display device 100 includes a transparent substrate 102, a display 104, an antenna module 106, and a plurality of conductive structures 108. In one embodiment, the display device 100 is a handheld display device. The handheld display device is, for example, a smart phone, a tablet computer, or a notebook computer, but not limited thereto.

The transparent substrate 102 of this embodiment may be a glass substrate such as quartz glass, alkali-free glass, soda glass, borosilicate glass, and alumino-silicate glass, but not limited thereto.

The display 104 of this embodiment emits an image light IML to the transparent substrate 102. The display 104 is, for example, a liquid crystal display (LCD), a light emitting diode (LED) display, a plasma display and so on, but not limited thereto.

The antenna module 106 of this embodiment is mounted on a millimeter wave module (not shown in FIG. 1A and FIG. 1B) and is adjacent to a surface S2 of the transparent substrate 102, and includes a receiving antenna and a transmitting antenna, but is not limited thereto. The antenna module 106 may be a millimeter wave antenna, and may be implemented in any type, such as a dipole antenna, a monopole antenna, a patch antenna, a loop antenna, a slot antenna, a slot+patch antenna, a LC antenna), and so on. In one embodiment, the antenna module 106 further includes a radiation unit (not shown in FIGS. 1A and 1B).

The plurality of conductive structures 108 of this embodiment are disposed on a surface Si of the transparent substrate 102 and a travel path of the image light IML, and form a conductive pattern CP1. The plurality of conductive structures 108 are, for example, transparent conductive structures. The material of the transparent conductive structure may include metal oxide, metal mesh or graphene, but is not limited thereto. The metal oxide may include indium tin oxide (ITO), indium zinc oxide (IZO), indium gallium zinc oxide (IGZO), aluminum zinc oxide (AZO), other suitable materials, or a combination of the above, but is not limited thereto.

In the display device 100 of this embodiment, when the antenna module 106 transmits a beam B1 to the transparent substrate 102, the plurality of conductive structures 108 may change the direction of the beam B1 and generate a beam B2 to the object (not shown in FIGS. 1A and 1B). Next, the antenna module 106 receives a beam RB2 reflected by the object to obtain position information of the object, or uses the beam B2 to perform wireless communication with the object.

In one embodiment of the invention, the direction of the beam B1 may be the same as the direction of the beam B2, or may be different from the direction of the beam B2. In one embodiment, the position information of the object includes at least one of a moving direction, a moving amount, and a moving speed of the object. In one embodiment, the object may be, for example, a finger, an eyeball, or a touch pen.

Moreover, the conductive pattern CP1 may be a periodic pattern. In the conductive pattern CP1, a distance between any two adjacent conductive structures of the plurality of conductive structures 108 is greater than 0.1 times a wavelength of the beam B1 and less than 1 times the wavelength of the beam B1. In one embodiment, the conductive pattern CP1 is a straight stripe pattern, an annular thread pattern, an oblique stripe pattern, or a concentric circle pattern, but not limited thereto.

The surface S1 and the surface S2 of the transparent substrate 102 may be two mutually perpendicular surfaces. In one embodiment, there is a cavity structure 110 between the display 104 and the transparent substrate 102, and the cavity structure 110 may serve as a ground structure, but is not limited thereto.

In one embodiment, the display device 100 further includes a detector (not shown in FIGS. 1A and 1B) and a controller (not shown in FIGS. 1A and 1B). The detector detects whether the display device is placed on a plane, and when the detector detects that the display device is placed on the plane, a tracking signal source is switched from the detector to the antenna module 106. After the controller switches the tracking signal source to the antenna module 106, the antenna module 106 performs a transmitting operation and a receiving operation to obtain the position information of the object. Finally, the controller transmits the position information obtained by the antenna module 106 to a head-mounted display device which is another display (not the display device 100).

In one embodiment, when the above-mentioned another display is initialized into a virtual reality (VR) system, the display device 100 (e.g. a mobile phone) may be used as a control device for operation. At this time, if returned values of the detector are all less than a specific threshold after a predetermined time, the detector determines that the display device 100 is in a static state (e.g. placed on a table). When the detector determines that the display device 100 is in a static state, the tracking signal source is switched from the detector to the antenna module 106. After the controller switches the tracking signal source to the antenna module 106, the antenna module 106 performs the transmitting operation and the receiving operation to obtain the position information of the object. Finally, the controller transmits the position information obtained by the antenna module 106 to the head-mounted display device.

In one embodiment, the detector may be an inertial measurement unit (IMU), but not limited thereto. In one embodiment, the antenna module 106 is, for example, a radar antenna, but not limited thereto.

Figure 2A:
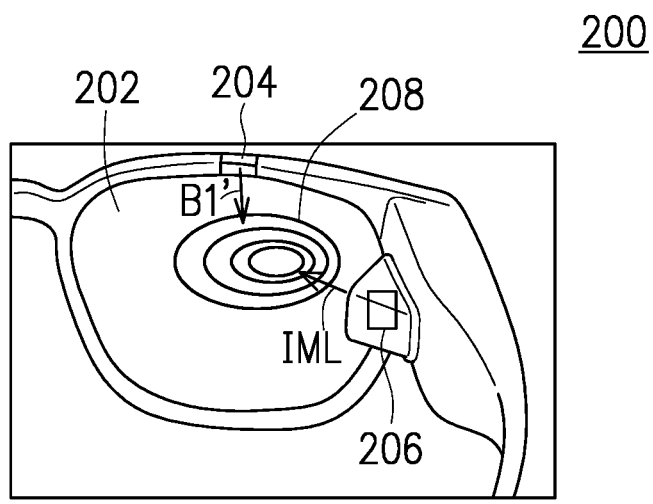
FIG. 2A is a front view of a display device according to an embodiment of the invention.
Figure 2B:
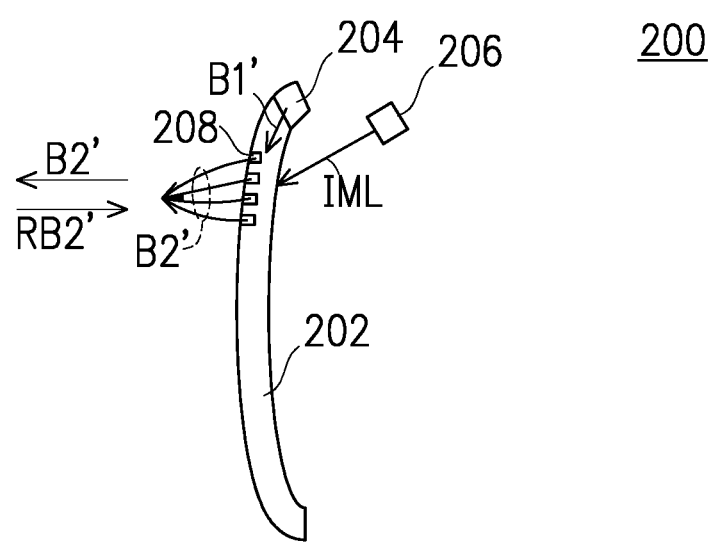
FIG. 2B is a side view of a display device according to an embodiment of the invention.

FIG. 2A is a front view of a display device according to an embodiment of the invention. FIG. 2B is a side view of a display device according to an embodiment of the invention. Please refer to FIG. 2A and FIG. 2B at the same time. A display device 200 includes a transparent substrate 202, a display 204, an antenna module 206, and a plurality of conductive structures 208. In one embodiment, the display device 200 is a head-mounted display device.

The transparent substrate 202, the display 204, the antenna module 206, and the plurality of conductive structures 208 of this embodiment are similar to the transparent substrate 102, the display 104, the antenna module 106, and the plurality of conductive structures 108 of the embodiment of FIGS. 1A and 1B. The difference between the display device 200 of this embodiment and the display device 100 of the embodiment of FIGS. 1A and 1B is that the display 204 and the antenna module 206 of the display device 200 are integrated into a frame of the head-mounted display device (please refer to the arrangement in FIG. 2A).

In the display device 200 of this embodiment, when the antenna module 206 transmits a beam B1' to the transparent substrate 202, the plurality of conductive structures 208 may change a direction of the beam B1' and generate a beam B2' to the object (not shown in FIGS. 2A and 2B). Next, the antenna module 206 receives a beam RB2' reflected by the object to obtain position information of the object.

In one embodiment, the direction of the beam B1' may be the same as the direction of the beam B2', or may be different from the direction of the beam B2'. In one embodiment, the position information of the object includes at least one of a moving direction, a moving amount, and a moving speed of the object. In one embodiment, the object is, for example, a finger, an eyeball, or a touch pen.

Figure 3A:
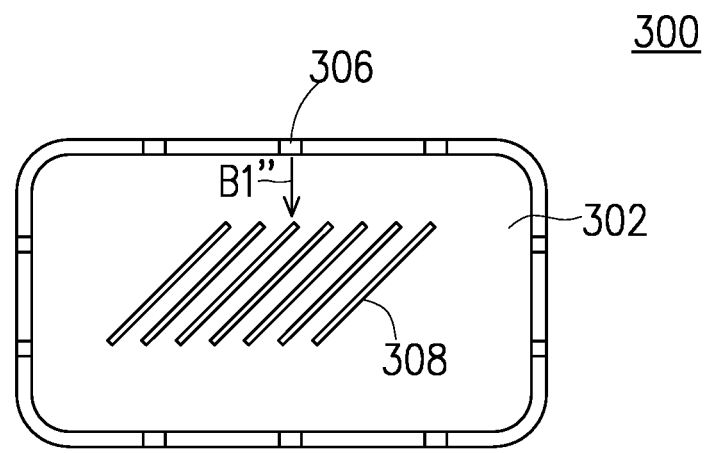
FIG. 3A is a front view of a display device according to an embodiment of the invention.
Figure 3B:
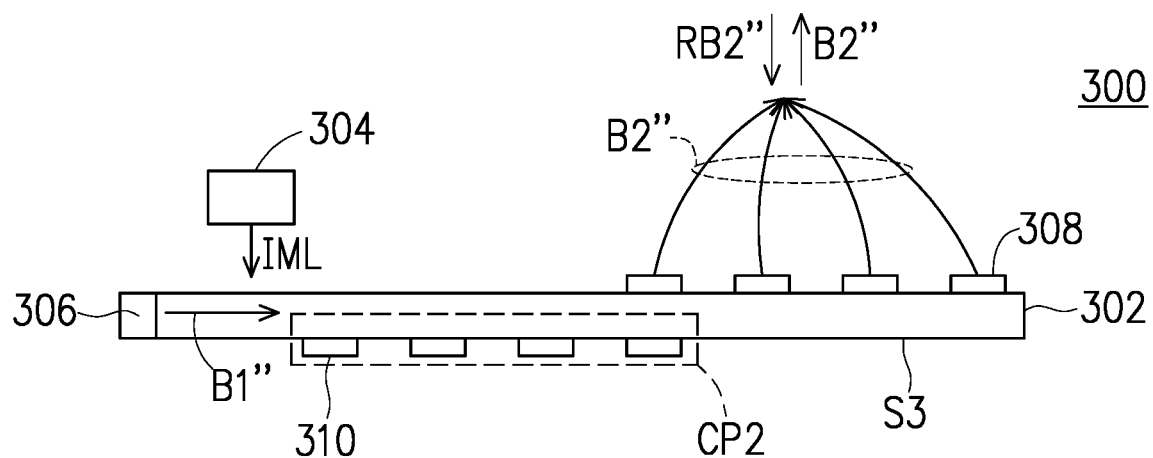
FIG. 3B is a side view of a display device according to an embodiment of the invention.

FIG. 3A is a front view of a display device according to an embodiment of the invention. FIG. 3B is a side view of a display device according to an embodiment of the invention. Please refer to FIGS. 3A and 3B at the same time. A display device 300 includes a transparent substrate 302, a display 304, antenna modules 306, and a plurality of conductive structures 308. In one embodiment, the display device 300 is a head-mounted display device.

The transparent substrate 302, the display 304, the antenna module 306, and the plurality of conductive structures 308 of this embodiment are similar to the transparent substrate 202, the display 204, the antenna module 206, and the plurality of conductive structures 208 of the embodiment of FIGS. 2A and 2B. The difference between the display device 300 of this embodiment and the display device 200 of the embodiment of FIG. 2A and FIG. 2B is that: the display 304 of the display device 300 is not integrated into a frame of the head-mounted display device, and the display device 300 includes a plurality of antenna modules 306, and the antenna modules 306 may all be integrated into the frame of the head-mounted display device.

In the display device 300 of this embodiment, when the antenna module 306 transmits a beam B1" to the transparent substrate 302, the plurality of conductive structures 308 may change a direction of the beam B1" and generate a beam B2" to the object (not shown in FIGS. 3A and 3B). Next, the antenna module 306 receives a beam RB2" reflected by the object to obtain position information of the object.

In one embodiment, the direction of the beam B1" may be the same as the direction of the beam B2", or may be different from the direction of the beam B2". In one embodiment, the position information of the object includes at least one of a moving direction, a moving amount, and a moving speed of the object. In one embodiment, the object is, for example, a finger, an eyeball, or a touch pen.

In this embodiment, the display device 300 further includes a plurality of conductive structures 310. The plurality of conductive structures 310 of this embodiment are disposed on a surface S3 of the transparent substrate 302 and the travel path of the image light IML and form a conductive pattern CP2. The plurality of conductive structures 310 are, for example, transparent conductive structures. The material of the transparent conductive structure may include metal oxide, metal mesh or graphene, but is not limited thereto. The metal oxide may include indium tin oxide (ITO), indium zinc oxide (IZO), indium gallium zinc oxide (IGZO), aluminum zinc oxide (AZO), other suitable materials, or a combination of the above, but is not limited thereto. In one embodiment, the conductive pattern CP2 is a periodic pattern. In the conductive pattern CP2, a distance between any two adjacent conductive structures of the plurality of conductive structures 310 is greater than 0.1 times a wavelength of the beam B1''' and less than 1 times the wavelength of the beam B1'''. In one embodiment, the conductive pattern CP2 is a straight stripe pattern, an annular thread pattern, an oblique stripe pattern, or a concentric circle pattern, but not limited thereto. The specific implementation of the plurality of conductive structures 310 is the same as the specific implementation of the plurality of conductive structures 308 and will not be described herein.

Figure 4A:
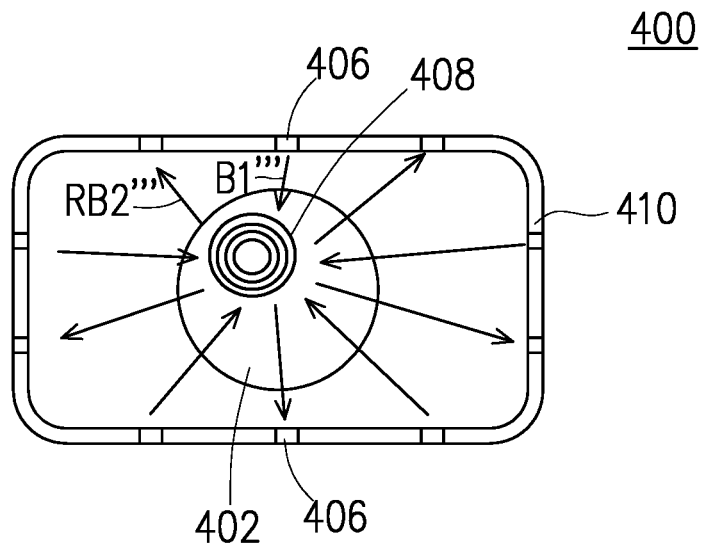
FIG. 4A is a front view of a display device according to an embodiment of the invention.
Figure 4B:
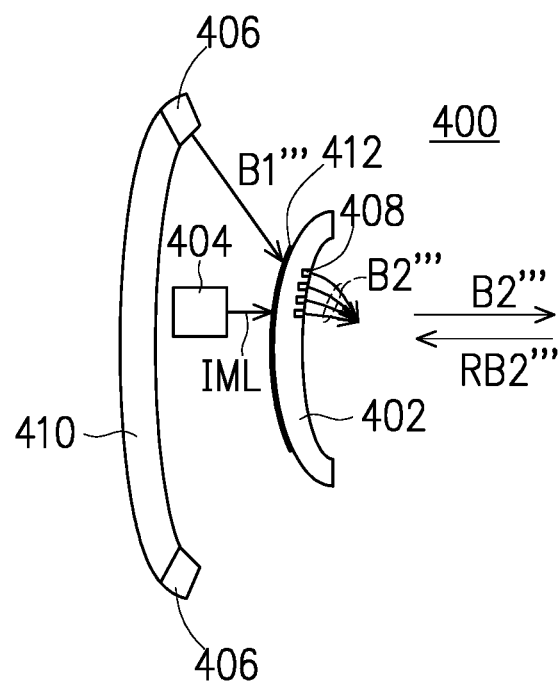
FIG. 4B is a side view of a display device according to an embodiment of the invention.

FIG. 4A is a front view of a display device according to an embodiment of the invention. FIG. 4B is a side view of a display device according to an embodiment of the invention. Please refer to FIG. 4A and FIG. 4B at the same time. A display device 400 includes a transparent substrate 402, a display 404, antenna modules 406, and a plurality of transparent conductive structures 408. The transparent substrate 402 is a soft material; the transparent conductive structures 408 are printed on a surface of the transparent substrate 402 (represented by a surface film 412 here). In one embodiment, the display device 400 is a head-mounted display device equipped with a contact lens.

The transparent substrate 402, the display 404, the antenna modules 406, and the plurality of transparent conductive structures 408 of this embodiment are similar to the transparent substrate 302, the display 304, the antenna modules 306, and the plurality of conductive structures 308 of the embodiment of FIGS. 3A and 3B. The display device 400 of this embodiment is different from the display device 300 of the embodiment of FIGS. 3A and 3B in that the display device 400 further includes an AR glasses frame 410, and the transparent substrate 402 is a contact lens.

In the display device 400 of this embodiment, when the antenna module 406 transmits a beam B1''' to the transparent substrate 402, the plurality of transparent conductive structures 408 may change a direction of the beam B1''' and generate a beam B2''' to the object (not shown in FIGS. 4A and 4B). Next, the antenna module 406 receives a beam RB2''' reflected by the object to obtain the position information of the object. It is worth mentioning that the display device 400 of this embodiment performs the transmitting operation and the receiving operation respectively by a plurality of antenna modules 406 (two antennas are indicated herein).

In one embodiment, the direction of the beam B1''' may be the same as the direction of the beam B2''', or may be different from the direction of the beam B2'''. In one embodiment, the position information of the object includes at least one of a moving direction, a moving amount, and a moving speed of the object. In one embodiment, the object is, for example, an eyeball or the like.

In summary, according to the display device provided by the embodiments of the invention, by disposing a transparent substrate, a display, an antenna module, together with a plurality of conductive structures, the image light and the beam are respectively emitted to the transparent substrate through the display and the antenna module, and then the direction of the beam is changed by the plurality of conductive structures disposed on the surface of the transparent substrate and the travel path of the image light. In this manner, in the embodiments of the invention, a plurality of conductive structures are disposed on the surface of the transparent substrate so as to achieve the effect of the millimeter wave antenna modules, which can reduce the thickness of the display device.

Although the invention has been disclosed by way of example, it is not intended to limit the invention. Anyone with ordinary knowledge in the technical field can make some changes and modifications without departing from the spirit and scope of the invention, and the protection scope of the invention shall be determined by the scope of the appended claims.

What is claimed is:
1. A display device, comprising:
   a transparent substrate;
   a display for emitting an image light to the transparent substrate;
   an antenna module for transmitting a first beam to the transparent substrate; and
   a plurality of first conductive structures, disposed on a first surface of the transparent substrate and a travel path of the image light and forming a first conductive pattern, wherein the plurality of first conductive structure change a direction of the first beam and generate a second beam to an object.
2. The display device according to claim 1, wherein the antenna module is disposed on a second surface of the transparent substrate.
3. The display device according to claim 2, wherein the position information of the object comprises at least one of a moving direction, a moving amount, and a moving speed of the object.
4. The display device according to claim 2, wherein the display device is a handheld display device, and the display device further comprises:
   a detector for detecting whether the display device is placed on a plane; and
   a controller for switching a tracking signal source from the detector to the antenna module when the detector detects that the display device is placed on the plane.
5. The display device according to claim 4, wherein after the controller switches the tracking signal source to the antenna module, the antenna module performs a transmitting operation and a receiving operation to obtain position information of the object.
6. The display device according to claim 4, wherein there is a cavity structure between the display and the transparent substrate.
7. The display device according to claim 1, wherein the antenna module receives the second beam reflected by the object to obtain position information of the object.
8. The display device according to claim 1, wherein the display device is a head-mounted display device, and the display device further comprises:

a plurality of second conductive structures, disposed on a third surface of the transparent substrate and a travel path of the image light and forming a second conductive pattern.

9. The display device according to claim 8, wherein the first conductive pattern and the second conductive pattern are periodic patterns, and in the first conductive pattern and the second conductive pattern, a distance between any two adjacent first conductive structures and a distance between any two adjacent second conductive structures are greater than 0.1 times a wavelength of the first beam and less than 1 times the wavelength of the first beam.

10. The display device according to claim 8, wherein the first conductive pattern and the second conductive pattern are a straight strip pattern, an annular thread pattern, an oblique stripe pattern, or a concentric circle pattern.

11. The display device according to claim 8, wherein the material of the plurality of first conductive structures and the plurality of second conductive structures is indium tin oxide or graphene.

* * * * *